United States Patent
Sonntag et al.

(10) Patent No.: US 12,049,567 B2
(45) Date of Patent: Jul. 30, 2024

(54) SPECIALIZED INKSETS AND ALTERNATIVE FLUIDS AND RELATED SYSTEMS

(71) Applicant: Brady Worldwide, Inc., Milwaukee, WI (US)

(72) Inventors: Richard C. Sonntag, Swarthmore, PA (US); Peter A. Budney, Menomonee Falls, WI (US); James C. Naas, Cedarburg, WI (US); Timothy W. Shay, Milwaukee, WI (US); Robert J. Quinn, Grafton, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 308 days.

(21) Appl. No.: 17/143,724

(22) Filed: Jan. 7, 2021

(65) Prior Publication Data
US 2021/0206986 A1 Jul. 8, 2021

Related U.S. Application Data

(60) Provisional application No. 62/958,519, filed on Jan. 8, 2020.

(51) Int. Cl.
*C09D 11/40* (2014.01)
*B41J 2/175* (2006.01)
(Continued)

(52) U.S. Cl.
CPC ........... *C09D 11/40* (2013.01); *B41J 2/17553* (2013.01); *B41M 1/20* (2013.01); *C09D 11/322* (2013.01);
(Continued)

(58) Field of Classification Search
CPC ........ B29C 64/112; B33Y 70/00; B41M 1/20; B41M 5/282; B41M 1/00; B41M 7/00;
(Continued)

(56) References Cited

U.S. PATENT DOCUMENTS 5,371,529 A * 12/1994 Eguchi ................. B41J 2/04591
347/68
5,956,063 A * 9/1999 Yokoi .................... G02B 5/201
430/7
(Continued)

OTHER PUBLICATIONS

European Patent Office, Extended European Search Report, Application No. 21738732.3, Jan. 3, 2024, 8 pages.

*Primary Examiner* — John Zimmermann
(74) *Attorney, Agent, or Firm* — Quarles & Brady LLP (57) ABSTRACT

Printer systems and associated ink cartridges can have specialized inksets and alternative fluids for use in printing. In such systems and cartridges, the inkset of a unique cartridge may be deliberately limited relative to traditional inksets that seek to have a wide color gamut such that chemistries having greater durability may be employed. Still further, such cartridges may include one or more functional inks that have a purpose other than merely coloration. Particularly in compact printers, for which space is limited, the system can be designed to accept various unique cartridges based on the intended printing application and print based on the characteristics of the received cartridge. Beyond this, the system may advise the user when a different cartridge is necessary and/or may be beneficially used for a particular application.

10 Claims, 8 Drawing Sheets

(51) Int. Cl.
  *B41M 1/20* (2006.01)
  *C09D 11/322* (2014.01)
  *B41J 2/005* (2006.01)
  *B41J 2/14* (2006.01)
  *B41J 2/17* (2006.01)
(52) U.S. Cl.
  CPC .................. *B41J 2/005* (2013.01); *B41J 2/14* (2013.01); *B41J 2/17* (2013.01)
(58) Field of Classification Search
  CPC ......... C09D 11/50; C09D 11/40; B41J 2/175; B41J 2/21; B41J 2/14; B41J 2/17; B41J 2/045; B41J 2/01; B41J 2/015
  See application file for complete search history.

(56) References Cited

U.S. PATENT DOCUMENTS

| | | | | |
|---|---|---|---|---|
| 6,036,295 | A * | 3/2000 | Ando | B41J 2/211 347/7 |
| 6,342,556 | B1 * | 1/2002 | Batdorf | B05D 7/08 524/432 |
| 6,431,671 | B2 * | 8/2002 | Matsumoto | B41J 2/04581 347/7 |
| 6,582,054 | B2 * | 6/2003 | Yamamoto | B41J 2/211 347/43 |
| 8,282,197 | B2 * | 10/2012 | De Voeght | B41M 5/0023 347/85 |
| 10,195,870 | B2 | 2/2019 | Chang et al. | |
| 2002/0093555 | A1 * | 7/2002 | Kobayashi | B41J 2/1752 347/86 |
| 2003/0224150 | A1 | 12/2003 | Ludwig et al. | |
| 2005/0174415 | A1 * | 8/2005 | Chen | B41M 7/0054 347/105 |
| 2007/0097193 | A1 | 5/2007 | Ma et al. | |
| 2007/0098959 | A1 * | 5/2007 | Lieberman | B41F 31/002 428/172 |
| 2008/0165237 | A1 * | 7/2008 | Yamauchi | C09D 11/101 347/102 |
| 2009/0250164 | A1 * | 10/2009 | Carrle | B44C 1/1741 427/256 |
| 2010/0247223 | A1 * | 9/2010 | Ribi | B41M 5/20 401/258 |
| 2011/0129674 | A1 * | 6/2011 | Rueger | C03C 23/00 424/617 |
| 2012/0026546 | A1 | 2/2012 | Miura | |
| 2012/0327156 | A1 * | 12/2012 | Aruga | B41J 3/4078 347/85 |
| 2013/0300788 | A1 * | 11/2013 | Konno | H04N 1/54 347/9 |
| 2014/0132653 | A1 * | 5/2014 | Kamiyama | B41J 2/175 347/6 |
| 2014/0210201 | A1 * | 7/2014 | Owen | G09F 3/0291 283/94 |
| 2019/0039403 | A1 * | 2/2019 | Whiteman | B42D 25/29 |
| 2019/0168413 | A1 * | 6/2019 | Conboy | B27N 9/00 |
| 2019/0187620 | A1 * | 6/2019 | Raillard | G04D 3/0092 |
| 2019/0210272 | A1 * | 7/2019 | Ochi | B29C 64/112 |
| 2020/0338809 | A1 * | 10/2020 | Raillard | B33Y 50/02 |
| 2021/0370605 | A1 * | 12/2021 | Raillard | G04B 45/0076 |
| 2023/0202169 | A1 * | 6/2023 | Calvo | G06F 3/1287 347/19 |

* cited by examiner

SPECIALIZED INKSETS AND ALTERNATIVE FLUIDS AND RELATED SYSTEMS

CROSS-REFERENCE TO RELATED APPLICATION

This application claims the benefit of U.S. Provisional Patent Application No. 62/958,519 entitled "Specialized Inksets and Alternative Fluids and Related Systems" filed on Jan. 8, 2020, which is incorporated by reference herein for all purposes.

FIELD OF INVENTION

This disclosure relates to specialized inksets and alternative fluids for use in printers. The inksets and/or fluids can be used to produce specialized images, for example, warning labels used in industrial settings, that may be more lightfast and resistant to ultraviolet (UV) light than images produced with standard cyan-magenta-yellow inksets, and/or have functional attributes such as conductivity, gloss finish, supplemental UV protection, scratch resistance, taggants, thermochromic materials, magnetic materials, reactive materials, and/or materials not in the visible spectrum but may be detected by ultraviolet or infra-red radiation.

BACKGROUND

Generally, inkjet printers are capable of jetting one kind of inkset, especially in an office printer environment where users only print on office quality paper or on common label and small sign materials. Such inkjet printers typically use consumable cartridges loaded with just this one kind of inkset.

Inkjet printers generally use traditional inksets, including either cyan-magenta-yellow (CMY) or cyan-magenta-yellow-black (CMYK) "process color" inks, to generate a full palette of colors by constructing a color image from dots applied in dither patterns of the process colors to produce a full range of hues in the a-b hue space defined by the CIE L*a*b* (CIELAB) color space. As is understood by one of skill in the art, the CIELAB color space is a three-dimensional color space where "L*" represents a color value of lightness ranging from black to white, "a*" represents a color value ranging from green to red, and "b*" represents a color value ranging from blue to yellow.

The inks may be based on soluble dyes or particulate pigments. Colors that may be produced by dithering dots of CMY process colors may range from cyan-blue-violet-magenta-red-orange-yellow-green-aquamarine, and all hues in between. In addition, lighter halftones of these colors, as well as various black and grayscale colors, may be created by spacing CMY and/or black (K) dots further apart to fill out a gamut of colors in the three-dimensional L*-a*-b* color space.

SUMMARY

Printers that use traditional cyan-magenta-yellow (CMY) or cyan-magenta-yellow-black (CMYK) inksets can suffer from many drawbacks. Most notably, the CMY or CMYK inksets produce printed materials that are susceptible to ultraviolet (UV) light, which can cause the colors of the printed material to change and/or fade over time. Inksets with dye inks generally provide greater initial color but lower durability (that is, poor lightfastness and waterfastness) than pigment inks, and pigment inks generally provide somewhat better durability with less initial color intensity than the dye inks. Even with pigmented CMY or CMYK inksets, these process color printing methods suffer several deficiencies—particularly in outdoor applications—including significant fade due to the underlying limitations of cyan, magenta, and yellow pigment chemistry, especially magenta and yellow pigment chemistry.

In addition to fade and related durability issues, printed materials generated with CMY or CMYK inksets may have difficulty achieving highly intense colors in certain regions of L*-a*-b* color space, including bright colors such as bright orange, royal blue, bright red, bright green, as well as deep "jewel tones" such as deep blue, deep violet, and emerald green. Such colors are often desirable to end users, even if they may not provide improved durability over extended periods of time. Some printers may use six to eight inks or more to achieve the highly intense colors though these printers are generally very large and expensive and only used in professional print shops and/or textile mills. The six to eight inks can include red, green, blue, orange, and violet, in addition to traditional CMY or CMYK process color inksets.

In addition to issues of fade, durability, and color intensity, there exist a wide range of functional attributes that printer users may want to include in a digitally created image by applying a functional fluid using inkjet technology. Such functional fluids may include, but are not limited to, clear coatings to provide gloss, UV protection, scratch resistance, or other beneficial attributes; fluorescent colors; taggants; thermochromic materials; magnetic materials; reactive materials; conductive materials; and/or materials which are not in the visible spectrum but may be detected by ultraviolet or infra-red radiation. These functional attributes are not provided by CMY or CMYK inksets.

This disclosure provides a compact and affordable printer that uses specialized inksets and/or alternative fluids to produce a specific color not reproducible using CMY or CMYK inksets, printed materials that are more lightfast and less susceptible to fade than printed materials generated using typical CMY or CMYK inksets, and/or printed materials that include a functional feature such as gloss, UV protection, scratch resistance, fluorescent colors, taggants, thermochromic materials, magnetic materials, reactive materials, conductive materials, materials which are not in the visible spectrum but may be detected by ultraviolet or infra-red radiation and/or other functional features not provided by CMY or CMYK inksets.

According to some aspects, a printing system is provided. The printing system includes a printhead, ink tanks (which may or may not be integrated with the printhead in an ink "cartridge"), and a printer. The ink cartridge is associated with a color gamut and configured to provide ink having a first process ink of a first color and a second process ink of a second color. The printer is configured to receive the ink cartridge. The printing system further includes at least one memory having instructions stored on it and one or more processors coupled to the memory and configured to execute the instructions. The instructions include receiving a print request from a user, determining that the printer cannot sufficiently fulfill the print request based on the first color and the second color, and causing at least one of a notification that the printer cannot fulfill the print request or a notification of a substitute process ink that can fulfill the print request or a notification that unsupported colors will be replaced with the closest available colors to be displayed to the user.

In some forms, the memory and the processor may be included in the printer.

In some forms, the notification may include information about an alternative ink cartridge that can be used to sufficiently fulfill the print request in which the second ink cartridge includes the substitute process ink, the substitute process ink being of a third color. The notification may include information about the ink cartridge not being able to fulfill the print request.

In some forms, the ink cartridge may include a third ink including at least one of a conductive ink, a clear ink, a reactant ink, a thermochromic ink, or an ink comprising traceable particles.

In some forms, the processor may be further configured to execute the instructions to determine that the print request can only be fulfilled by dithering dots of the first process ink and the second process ink.

In some forms, the processor may be further configured to execute the instructions to determine that the printer cannot reproduce one or more colors included in the print request within a predetermined margin of error based on the first color and the second color.

In some forms, the processor may be configured to further execute the instructions to cause a notification comprising information about a second ink cartridge comprising additional inks or functional fluids, which may be displayed to the user. The second ink cartridge may include a black process color ink or a process color ink not included in the ink cartridge.

In some forms, the printer may be a desktop printer.

According to another aspect, an ink cartridge configured to provide ink to a printable medium is disclosed. The ink cartridge includes a first process ink of a first color, a second process ink of a second color, and a third process ink of a third color in which the ink cartridge cannot reproduce at least one color included in the CIELAB color space.

In some forms of the cartridge, the ink cartridge may be configured to reproduce no more than one third of the a*b* color space included in the CIELAB color space.

In some forms, each of the first process ink, the second process ink, and the third process ink may be configured to be applied to the printable medium in order to form a printed material, the printed material being configured to pass at least one of an ASTM G155 test, an ASTM G154 test, an ASTM D3424 test, an ASTM D5010 test, or an ASTM F2366 test.

In some forms, the printable medium may include at least a portion of one of a safety sign, a warning label, a lockout tag out process document, a food packaging, or an industrial strength label.

In some forms, the first color is neither cyan nor magenta, the second color is neither cyan nor magenta, and the third color is neither cyan nor magenta. Further, none of the first color, the second color, and the third color may be yellow in some variations of this.

In some forms, the first color may be black.

In some forms, at least one of the first color, the second color, or the third color is included in ISO 3864-1.

According to another aspect, an ink cartridge configured to provide ink to a printable medium is disclosed. The ink cartridge includes a first ink comprising a process ink, a second ink, and a third ink comprising a functional ink.

In some forms of this cartridge, the functional ink may be a conductive ink.

In some forms, the first ink, the second ink, and the third ink may be configured to be applied to a printable medium, and the functional ink may be a clear ink configured to provide UV protection, abrasion/scratch resistance, gloss, or other beneficial attributes to the printable medium.

In some forms, the functional ink may be a thermochromic ink configured to be applied to a printable medium in which the functional ink is configured to change appearance in response to a change in temperature.

In some forms, the functional ink may include traceable particles configured to emit an electromagnetic signal in response to stimulation.

In some forms, the second ink may include a second functional ink.

According to yet another aspect, a compact color desktop inkjet printer with ink cartridge(s) or tank(s) is disclosed. One or more of the common CMY or CMYK process color(s) is/are replaced with one or more alternative fluid(s) that fall outside the color specifications of CMY or CMYK inks and provide special functionality that enhance the desired attributes of the printed material.

In some forms of this printer, one or more of the functional fluids may be an alternative process color.

In some forms, one or more of the alternative fluids may be the same ink as one of the remaining colors, may be a clear material, may be a fluorescent color ink, may be a taggant, may be a thermochromic material, may be an electrically conductive material, may be a reactive material, and/or may be a material that is not in the visible spectrum but may be detected by ultraviolet or infra-red radiation.

According to still another aspect, a compact color desktop inkjet printer is disclosed. This printer includes one or two printheads, which may be multi-color printheads with up to six separate ink tanks, or one or two cartridges where the printhead is integrated with the ink tanks, one or two of which may be multi-color printheads, and which include alternative fluids including special functional fluids in addition to the traditional CMY or CMYK inks to provide special functionality that enhance to desired attributes of the printed image.

In some forms, one or more of the alternative fluids may be an alternative process color.

In some forms, one or more of the alternative fluids may be the same ink as one of the remaining colors, may be a clear material, may be a fluorescent color ink, may be a taggant, may be a thermochromic material, may be an electrically conductive material, may be a reactive material, and/or may be a material that is not in the visible spectrum but may be detected by ultraviolet or infra-red radiation.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 1A:
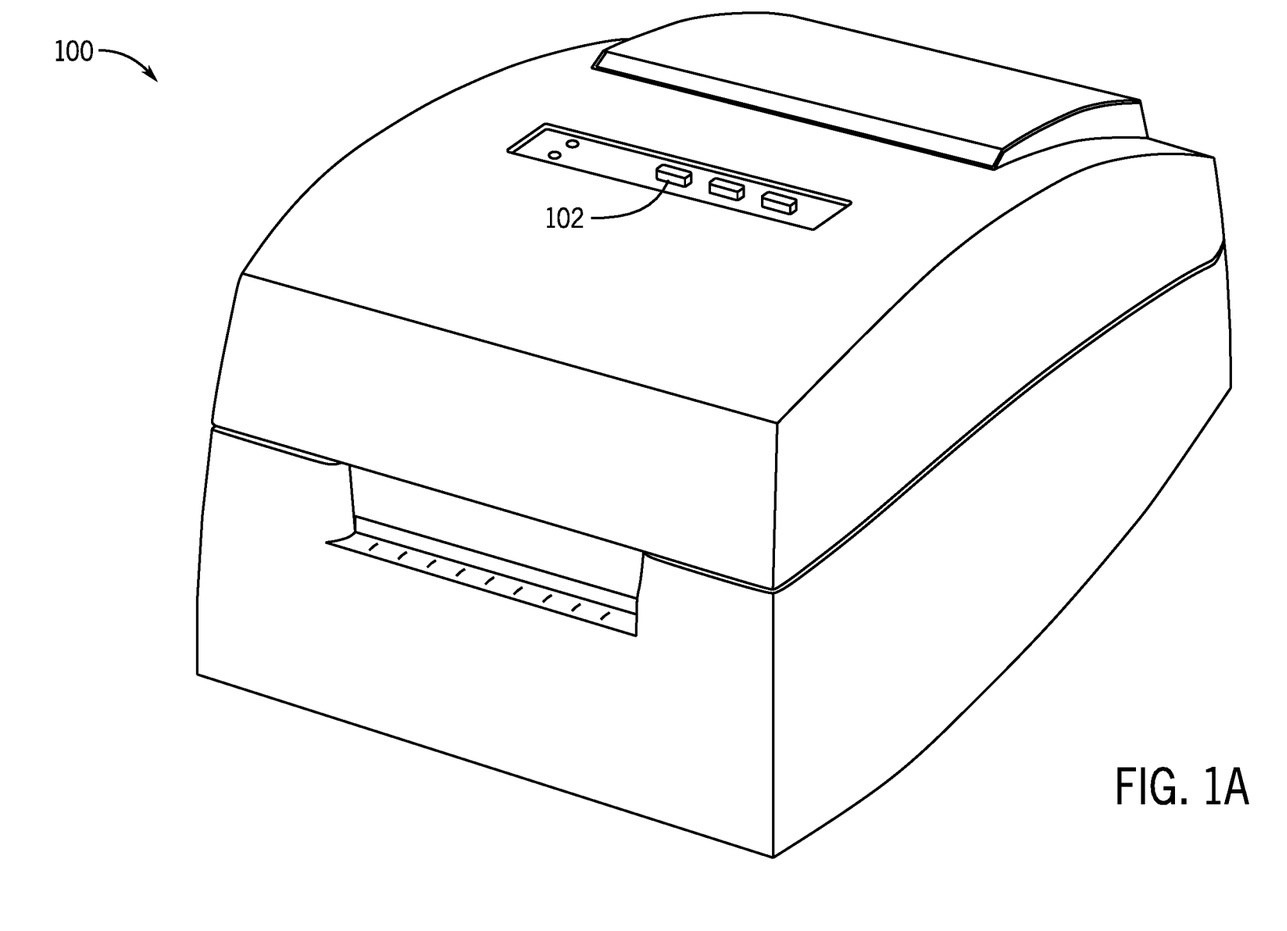
FIG. 1A shows a front view of an exemplary inkjet printer.
Figure 1B:
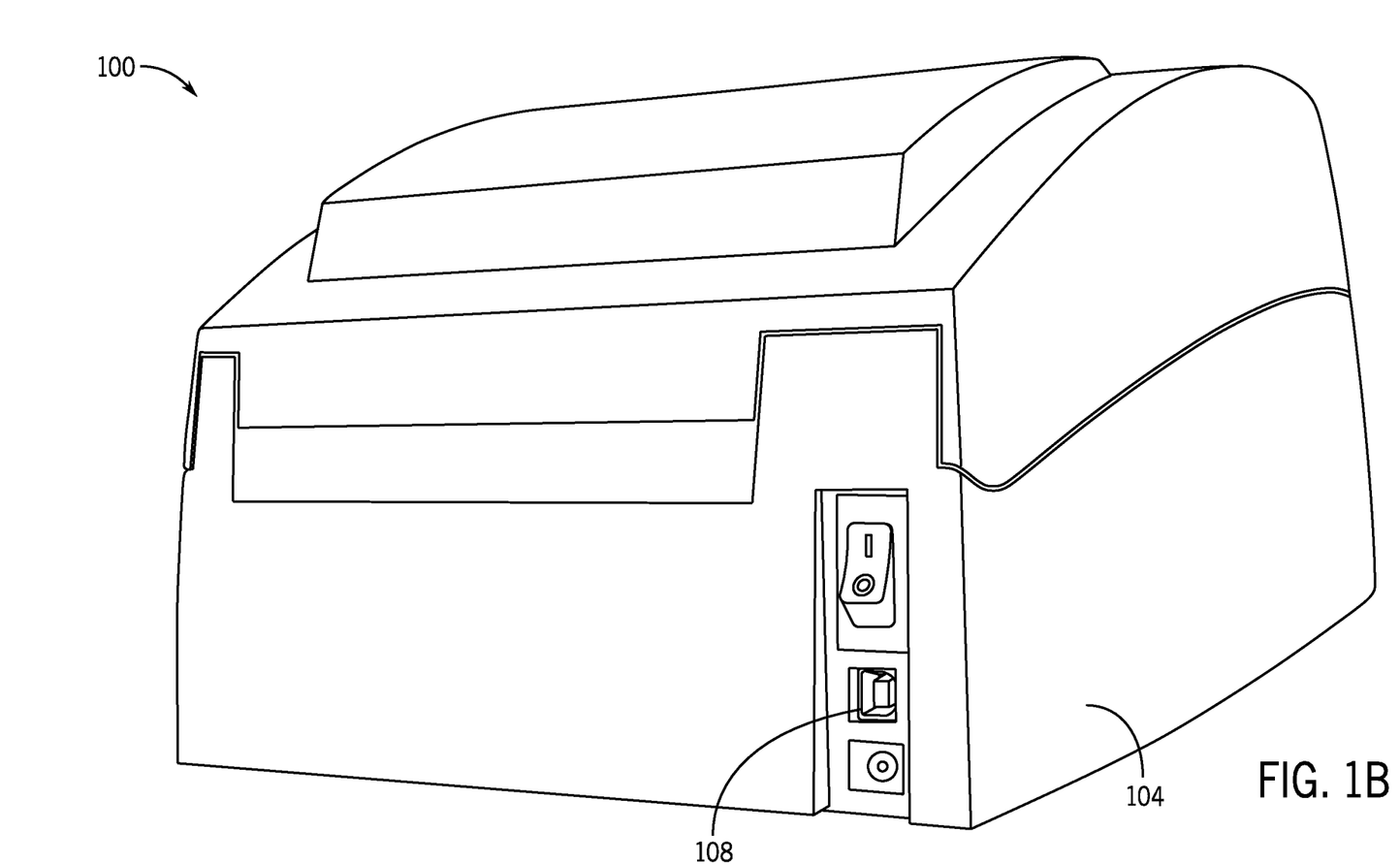
FIG. 1B shows a rear view of the inkjet printer shown in FIG. 1B.

Referring to FIG. 1A and FIG. 1B, an exemplary inkjet printer 100 is shown. FIG. 1A shows a front view of the inkjet printer 100, and FIG. 1B shows a rear view of the inkjet printer 100. More specifically, the inkjet printer 100 is a BradyJet J2000 color label printer. As shown, the inkjet printer 100 includes a casing 104 and a connection port 108. As illustrated, the connection port 108 is a Universal Serial Bus (USB) port and can be used by an external computational device to communicate with and/or control the inkjet printer 100. Of course, other types of connection, both wired and wireless are contemplated as being workable. The inkjet printer 100 can also include one or more input buttons 102.

Figure 2:
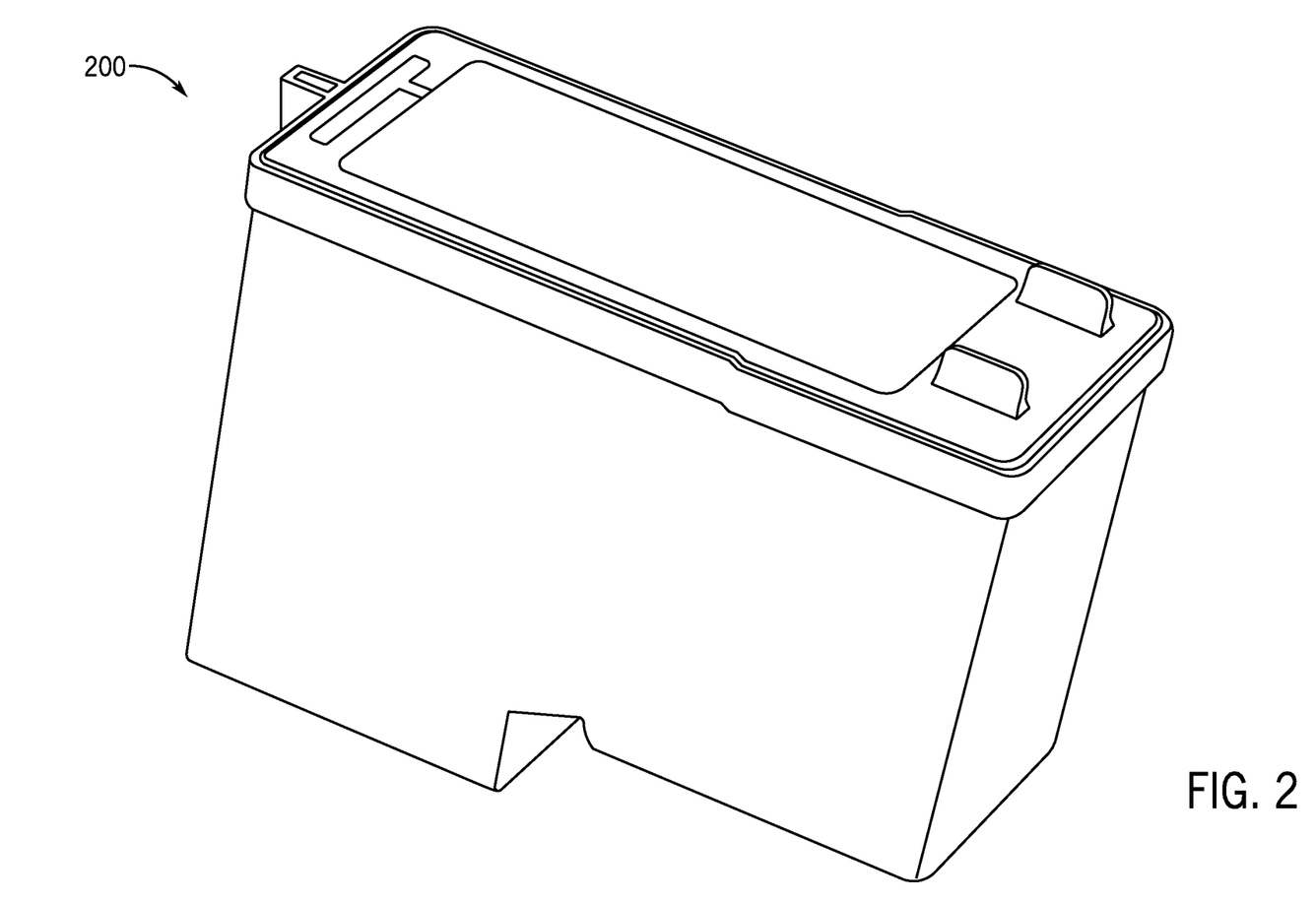
FIG. 2 shows an exemplary ink cartridge.

With further reference being made to FIG. 2, an exemplary ink cartridge 200 is shown. More specifically, the ink cartridge 200 is a BradyJet J2000 ink cartridge. The ink cartridge can contain up to three process color inks and/or alternative fluids (not shown) that will be described in detail below. The inkjet printer 100 can receive the ink cartridge 200 and use the process color inks and/or alternative fluids to produce printed materials such as labels.

Figure 3:
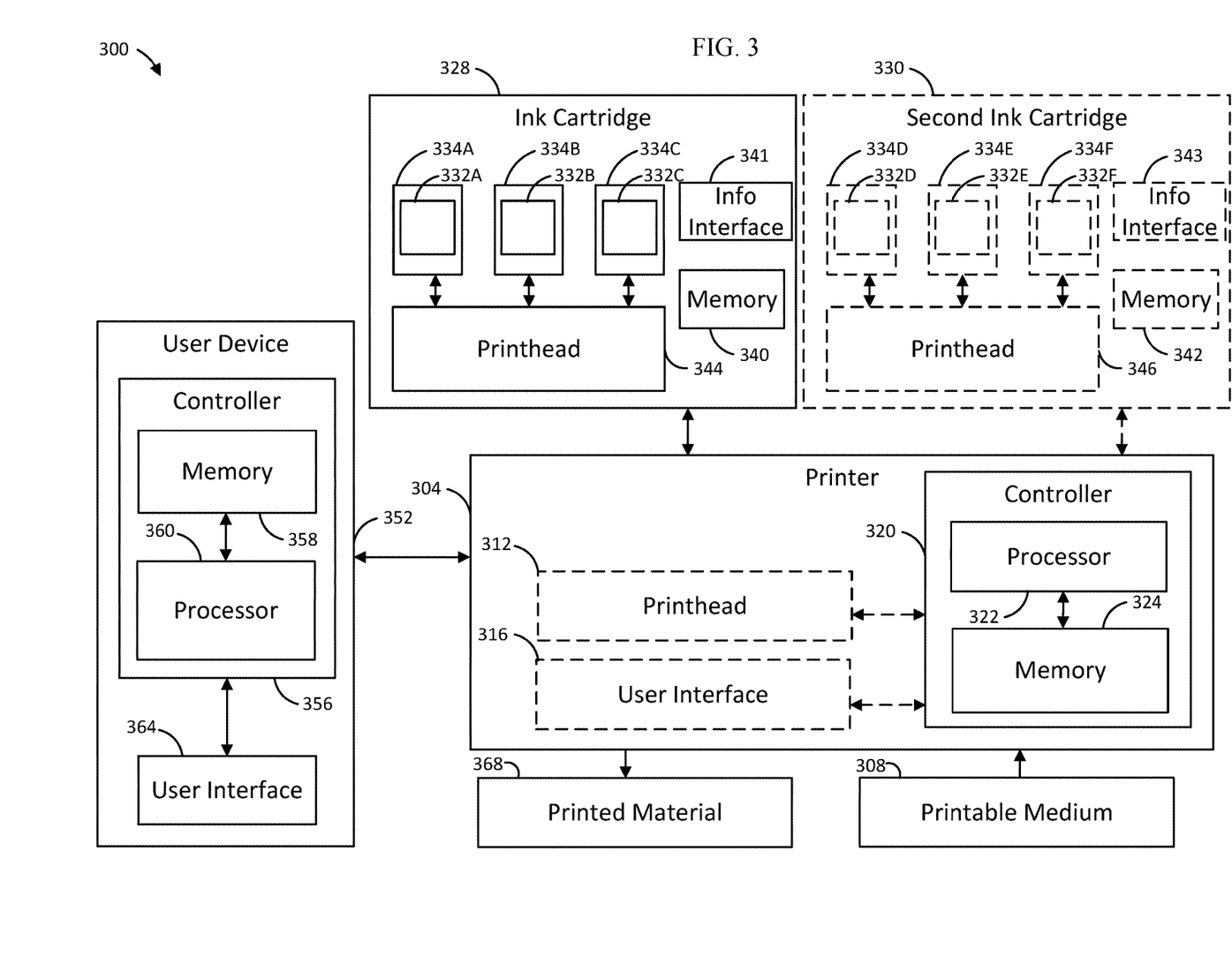
FIG. 3 shows an exemplary printing system.

Turning now to FIG. 3, an exemplary printing system 300 is shown. The printing system 300 can include a printer 304 coupled to an ink cartridge 328 received by the printer 304. In some embodiments, the ink cartridge 328 can be the ink cartridge 200 described above, and the printer 304 can be the printer 100 described above; however, the illustrations of FIGS. 1 and 2 are only exemplary in nature. In some forms, the printer 304 can be a desktop printer sized no greater than thirty inches along a first dimension, twenty-four inches along a second dimension, and eighteen inches along a third dimension.

The printing system 300 can include a printable medium 308. The printer 304 can continuously or intermittently receive the printable medium 308 therein. The printer 304 can apply ink to at least a portion of the printable medium 308 to produce a printed material 368. The printable medium 308 can include materials such as polyester, magnetic polyester, vinyl, label stock, polypropylene, and/or paper. The printable medium 308 can be used to produce industrial printed materials including (but not limited to) safety signs, warning labels, lockout tag out process documents, food packaging, industrial strength labels such as arc flash labels, barcode labels, general & industrial identification labels, Globally Harmonized System (GHS) & chemical labels, laboratory identification labels, laboratory/healthcare identification labels, lean/5S markings, pipe and valve markings, visual workplace labels, and/or warehouse markings. At least one material included in the printable medium 308 can be inkjet print-receptive. The printable medium 304 can be adhesive as well as continuous or die-cut.

The printer 304 can include a controller 320 including a processor 322 coupled to a memory 324 including computer readable instructions stored thereon. The computer readable instructions can include processes for controlling a printhead 344 in order to apply dots of fluids such as process color inks to the printable medium 308. In preferred embodiments, a printhead 344 is included in the ink cartridge 328. In other embodiments, a printhead 312 is included in the printer 304 and is not part of the cartridge. The printhead 344 can be a piezoelectric printhead. The computer readable instructions can also include processes for controlling supplemental printing hardware (not shown) included in the printer such as a stepper motor. The printhead 344 can selectively apply dots of fluids such as process color inks to the printable medium 308 in a dither pattern to sufficiently position two or more process color inks in order to effectively create colors other than the colors of the process color inks.

The ink cartridge 328 can include up to three fluids such as a first fluid 332A disposed in a first reservoir 334A, a second fluid 332B disposed in a second reservoir 334B, and a third fluid 332C disposed in a third reservoir 334C. Some embodiments can include up to six fluids and six ink reservoirs in two separate ink cartridges of up to three fluids each and may be used apart from one another, or in certain printer configurations, simultaneous with one another. In these embodiments, the inkjet printer 304 can receive an optional second ink cartridge 330 that can include a fourth fluid 332D disposed in a fourth reservoir 334D, a fifth fluid 332E disposed in a fifth reservoir 334E, and/or a sixth fluid 332F disposed in a sixth reservoir 334F. The reservoirs may be referred to as ink tanks.

Each of the fluids 332A-C can be a process color ink or an alternative fluid such as a gloss coating, a UV protection clear coating, other clear coatings, a scratch resistant coating, a fluorescent color ink, conductive inks, and/or or fluids that include taggants, thermochromic materials, magnetic materials, reactive materials, and/or materials which are not in the visible spectrum but may be detected by ultraviolet or infra-red radiation. For reasons that will be explained below, at least one of a cyan process color ink, a magenta process color ink, and a yellow process color ink are not included in the fluids 332A-C. Accordingly, the ink cartridge can be associated with a limited color gamut that includes a fraction of the usual a*b* color space, which will be described below.

Certain three-fluid sets that can be included as the first fluid 332A, the second fluid 332B, and the third fluid 332C include red-yellow-black, blue-yellow-black, green-yellow-black, orange-red-black, red-black-black, red-black-clear, violet-cyan-black, and other process color combinations based on regional and/or custom needs. Other three-fluid sets can include at least one alternative fluid such as a functional fluid. For example, some three-fluid sets can include a single process color such as black, white, or red process color ink, and two alternative fluids. In some embodiments, the two alternative fluids can be a fluid containing taggants (i.e., traceable particles) and a clear fluid for jetting traceable particles in text or graphics for security, brand protection, and/or entertainment applications, a thermochromic fluid and a clear fluid for jetting temperature indicating text or graphics for laboratory or food packaging applications, a reactant fluid and a clear fluid for jetting on labels that can detect change in environment, gas leaks, or vacuum breaches or for printed sensor applications, or a conductive ink and a clear fluid for jetting content for internet of things (IoT) applications. Clear fluids can include UV inhibitors, specialized polymers or other protective components, and may be jetted on top of other fluids such as process color inks. Certain three-fluid sets can include the same process color ink in two of the reservoirs 334A-C in order to increase durability and/or printing speed. Three-fluid sets used for outdoor warning signage can include two black process color inks and a red process color ink, or a black process color ink, a red process color ink, and a clear ink. Some three-fluid sets, which can be inksets, used for drum labeling and/or GHS applications can include two black process color inks and a red process color ink. Certain three-fluid sets can include one or more process color inks of colors included in a regulated safety sign specification such as ISO 3864-1.

The ink reservoirs 334A-C can be integral with or indirectly coupled to the printhead 344. The fluids 332A-C can be in fluid communication with the printhead 344 of the cartridge 328 (or alternatively the printhead 312 of the printer 304) in order for the printhead 344 to jet one or more of the fluids 332A-C onto the printable medium 308 and create the printed material 368. The printed material 368 can include at least a portion of the printable medium 308 impregnated with at least one of the fluids 332A-332D. In some embodiments, the printhead 344 can include multiple discrete printheads. The printhead 344 can be a multi-color printhead.

The ink cartridge can also include a memory 340 including information about the fluids 332A-C and/or the cartridge 328. More specifically, the memory 340 can include a serial number and/or a model number of the ink cartridge, chemistry information (e.g., pigment composition) of the fluids 332A-C, colors of the fluids 332A-C, fluid levels (e.g., an amount remaining) of each of the fluids 332A-C, shelf life of the ink cartridge 328, or other information relevant to the ink cartridge 328 and/or fluids 332A-C. The memory 340 can be coupled to and in communication with the controller 320 in order to provide the information about the fluids 332A-C and/or the cartridge 328 to the controller 320.

In some embodiments, the ink cartridge 328 can include an ink cartridge information interface 341 alternatively or in addition to the memory 340. The ink cartridge information interface 341 may communicate at least a portion of the information provided by the memory 340 to the inkjet printer 304, albeit without the use of a memory such as random access memory (RAM). Instead, the ink cartridge information interface 341 can include pins or other physical features detectable by the inkjet printer 304 that can indicate information about the inkjet cartridge 328 such as serial number, ink types, etc.

The optional second ink cartridge 330 can also include a second memory 342 that can be substantially the same as the memory 340 included in the ink cartridge 328. The second ink cartridge 330 can also include a second printhead 346 in fluid communication with the fluids 332D-F. The second printhead 346 can be substantially the same as the printhead 344 included in the ink cartridge 328. The optional second ink cartridge 330 can also include a second ink cartridge information interface 343 that can be substantially the same as the ink cartridge information interface 341 included in the ink cartridge 328.

The printer 304 can be coupled to a user device 352 that can provide print requests to the printer 304. The user device 352 can be a computational device such as a smartphone, a tablet computer, a laptop, or a desktop computer system. The printer 304 can be coupled to the user device 352 via a wired connection such as a USB connection, a parallel port connection, or an Ethernet connection, for example. The printer 304 can be coupled to the user device 352 via a wireless connection such as Bluetooth, WiFi, or Zigbee, for example. The user device 352 can include a controller 356 including a processor 360 coupled to a memory 358 including computer readable instructions stored thereon. The instructions can include processes for receiving print requests from a user and providing the print requests to the printer 304, which will be described in detail below. The controller 356 can be coupled to a user interface 364 that can receive inputs from the user as well as display outputs to the user. The user interface 364 can include a touchscreen that both receives inputs and displays outputs if the user device 352 is a smartphone, a tablet computer, a laptop computer including a touchscreen, or a desktop computer system including a touchscreen display which may be integral to a computational device (i.e., the desktop computer system is an all-in-one system) or a separate from the computational device (i.e., the desktop computer system includes a desktop tower connected to a touchscreen display). The user interface 352 can include one or more user input devices such as a keyboard, a mouse, a trackpad, a microphone for receiving voice commands, and/or a camera such as a video camera. The user interface 352 can include one or more user output devices such as a display (e.g., a computer screen), lights such as light emitting diodes (LEDs), and/or speakers.

In some embodiments, the printer 304 can include a printer user interface 316 coupled to the controller 320. The printer user interface 316 can be the same as the user interface 364 included in the user device 352 and described above. In these embodiments, the controller 320 can be programmed to execute the processes executed by the controller 356 included in the user device 352 in addition to any printer-specific processes (e.g., controlling the printhead 344), and all functionality of the user device 352 can be integrated into the printer 304. These embodiments allow a standalone printer 304 to be used to produce the printed material 368 without an external device, which may be desirable in certain scenarios.

Figure 4:
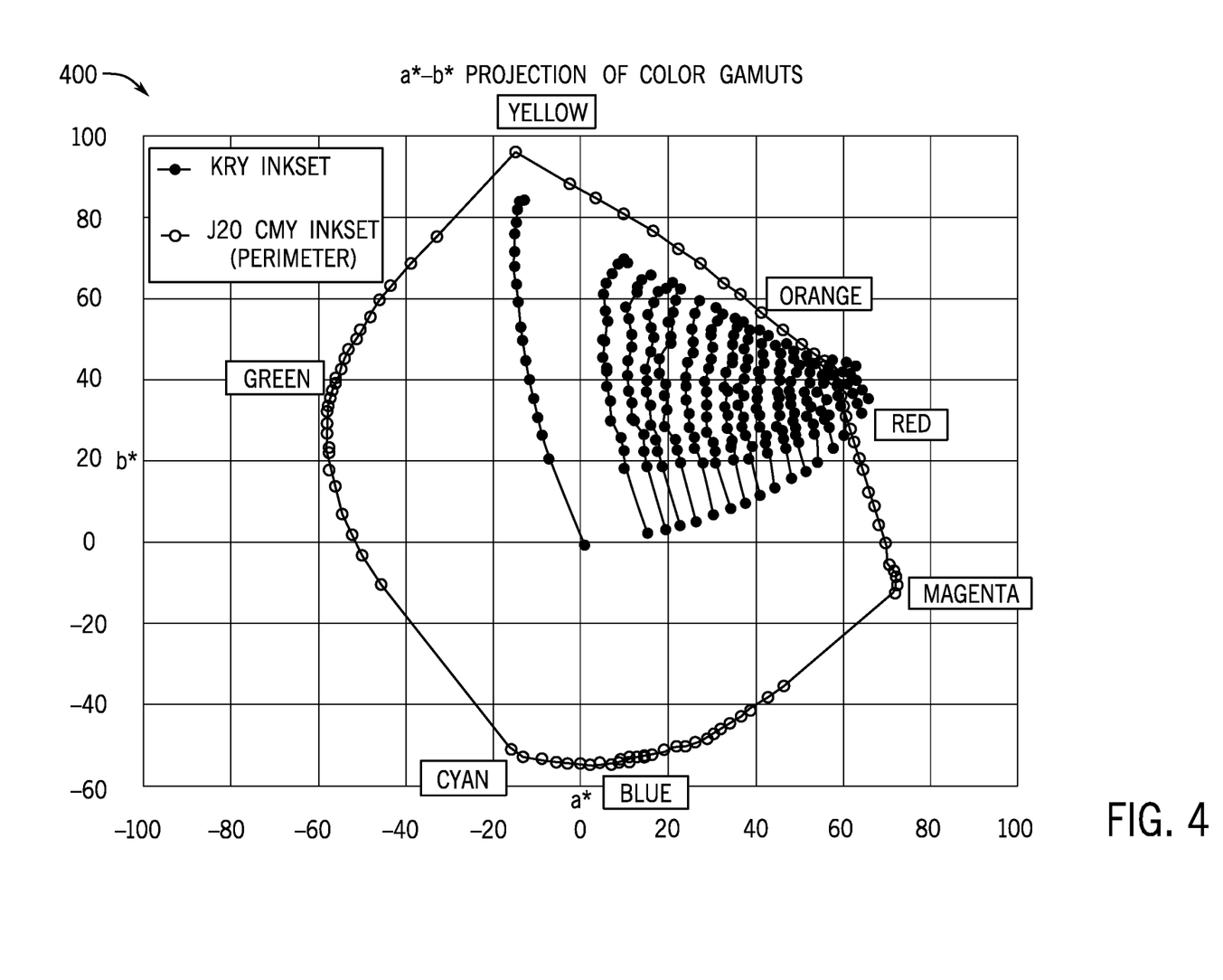
FIG. 4 shows an a*-b* projection of color gamuts.

Referring to FIG. 3 as well as FIG. 4, an a*-b* projection of color gamuts 400 is shown. The achievable color gamut may be defined as a region in L*-a*-b* color space represented by all combinations of the various inks in a given inkset. In FIG. 4, only the a*-b* portion of the L*-a*-b* is shown. The projections of color gamuts 400 compares the colors reproducible by two different inksets, a traditional inkset including cyan, magenta, and yellow process color inks, and an alternative inkset including black, red, and yellow process color inks. The yellow ink included in the traditional inkset is based on yellow pigment chemistry typically used for desktop office printing, such as pigment yellow 74 or 17. The yellow process color ink included in the alternative inkset is based on pigment yellow 155 chemistry, and is more lightfast but slightly less intense than the yellow process color ink in included in the traditional inkset. The red process color ink included in the alternative inkset is based on pigment red 254 chemistry. The black process color ink, the red process color ink, and the yellow process color ink included in the alternative inkset can be included as the first fluid 332A, the second fluid 332B, and the third fluid 332C respectively in the ink cartridge 328.

As shown in FIG. 4, the traditional inkset can be used to produce colors at all angular locations (i.e., colors at three hundred and sixty degrees) of the a*-b* color space, including angular locations corresponding to the colors green, yellow, orange, red, magenta, blue, and cyan. In contrast, the alternative inkset can be only be used to produce a subset of the colors at angular locations of the a*-b* color space. As shown in FIG. 4, the alternative inkset may only be able to reproduce about ninety degrees (or one quarter) of the angular locations of the a*-b* color space, from about ten degrees to one hundred degrees. In other words, the alternative inkset may only be able to produce a fraction, for example fifty percent, thirty percent, twenty percent, or less of the colors the traditional CMY inkset is capable of producing. The alternative inkset can be applied to the printable medium 308 by applying dots of the red process color ink and the yellow process color ink in a dither pattern to render colors of yellow, red-shade "safety" yellow, orange, red, and all hues in between. Other alternative inkset with non-traditional colors (i.e., inksets that do not include at least one of a cyan process color ink, a magenta process color ink, and a yellow process color ink) can be used to create similarly intense colors such as royal blue and bright green, as well as deep "jewel tones" such as deep blue, deep violet, and emerald green. Additionally, the dots can be spaced further apart to render lighter halftone images of these hues. As a result of using the red and yellow process color inks instead of traditional inks, the alternative inkset can be used to produce more intense red colors than the traditional inkset. The more intense red colors producible by the alternative inkset are spaced further radially away at a given angular position than the most intense red colors producible by the traditional inkset at the given angular position. Previously, it has not been possible to produce these more intense red colors using an affordable, compact printer such as the BradyJet J2000 color label printer. However, the alternative inkset, which eschews the traditional CMY or CMYK inksets, makes it possible to affordably produce such intense reds without the use of an expensive, bulky, specialized printer. Thus, by eliminating at least one of cyan, magenta, and yellow process color inks from an inkset to create an alternative inkset, a printer using the alternative inkset can produce more intense colors that are not producible using traditional CMY or CMYK inksets.

Figure 5A:
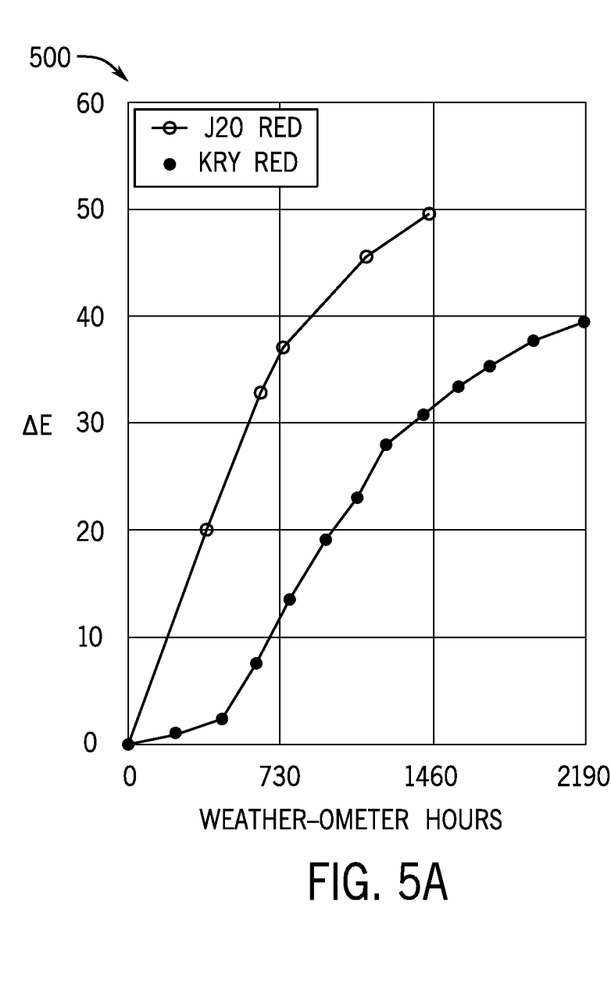
FIG. 5A shows fade performance in $\Delta E$ vs. WeatherOmeter Hours for a traditional inkset and an alternative inkset for a specific red color.
Figure 5B:
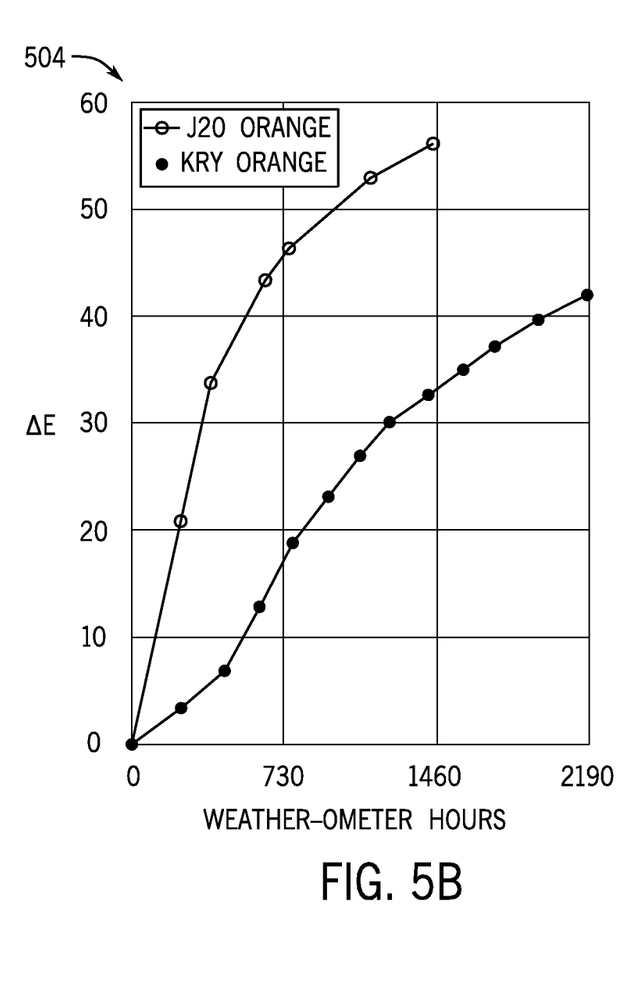
FIG. 5B shows fade performance in ΔE vs. Weather-Ometer Hours for the traditional inkset and the alternative inkset of FIG. 5A for a specific orange color.

Referring now to FIG. 4 as well as FIGS. 5A and 5B, graphs of fade performance of the traditional inkset and the alternative inkset described above are shown. More specifically, FIG. 5A shows fade performance in ΔE vs. Weather-Ometer Hours for the traditional inkset and the alternative inkset for a specific red color. FIG. 5B shows fade performance in ΔE vs. Weather-Ometer Hours for the traditional inkset and the alternative inkset for a specific orange color.

CIELAB color space is defined such that a change of color of a 1-3 units (commonly denoted as ΔE) is barely visible to trained or typical human observers, with larger changes occurring as fading and other degradation mechanisms continue over time. The amount of degradation that is acceptable can vary widely depending on the user expectations and target application, including but not limited to archival photographs, office documents, brochures, textiles, labels, tags, signs, etc. Similarly, the environmental factors causing the degradation can range from mild indoor light to harsh exterior weather exposure including sunlight, ozone, rainwater, ice, harsh chemicals, pressure washing, etc. Regardless of the acceptable amount of color change for a given application, an improvement in performance is accomplished when the amount of exposure time to cause a given amount of degradation (as commonly measured by ΔE) is increased by 10%, 50%, 100%, 200%, or more.

Additionally, a higher initial color intensity can have a beneficial impact on ultimate durability because greater fade exposure time is required before the image degrades to the point of unacceptability.

To test the traditional and alternative inksets, red and orange colors were printed onto substrates to generate printed materials that were subjected to the Atlas Weather-Ometer, and the fade from the original color was measured a predetermined time points. The Atlas Weather-Ometer simulates weather conditions that the inksets would be subjected to in the real world. As shown, the alternative inkset outperforms the traditional inkset in fade performance for both red and orange. By using a restricted-hue set of alternative process color inks (e.g., black, yellow, and red process color inks), the more durable and/or intense ink colors will degrade at a slower rate, allowing the lifetime of the printed material (as defined by whatever exposure mechanism and color metric is relevant to the specific application) to be extended by 10%, 50%, 100%, 200%, or more. In some embodiments, the alternative inksets can be used to generate printed materials configured to pass an ASTM G155 test, ASTM G154 test, ASTM D3424 test, an ASTM D5010 test, or an ASTM F2366 test.

Thus, by eliminating at least one of cyan, magenta, and yellow process color inks from an inkset to create an alternative inkset, a printer using the alternative inkset can produce more durable and lightfast colors than traditional CMY or CMYK inksets. Such durability can be enhanced by the use of more durable and chemically stable colors in the inkset, albeit at the expense of having a wide color gamut.

Figure 6:
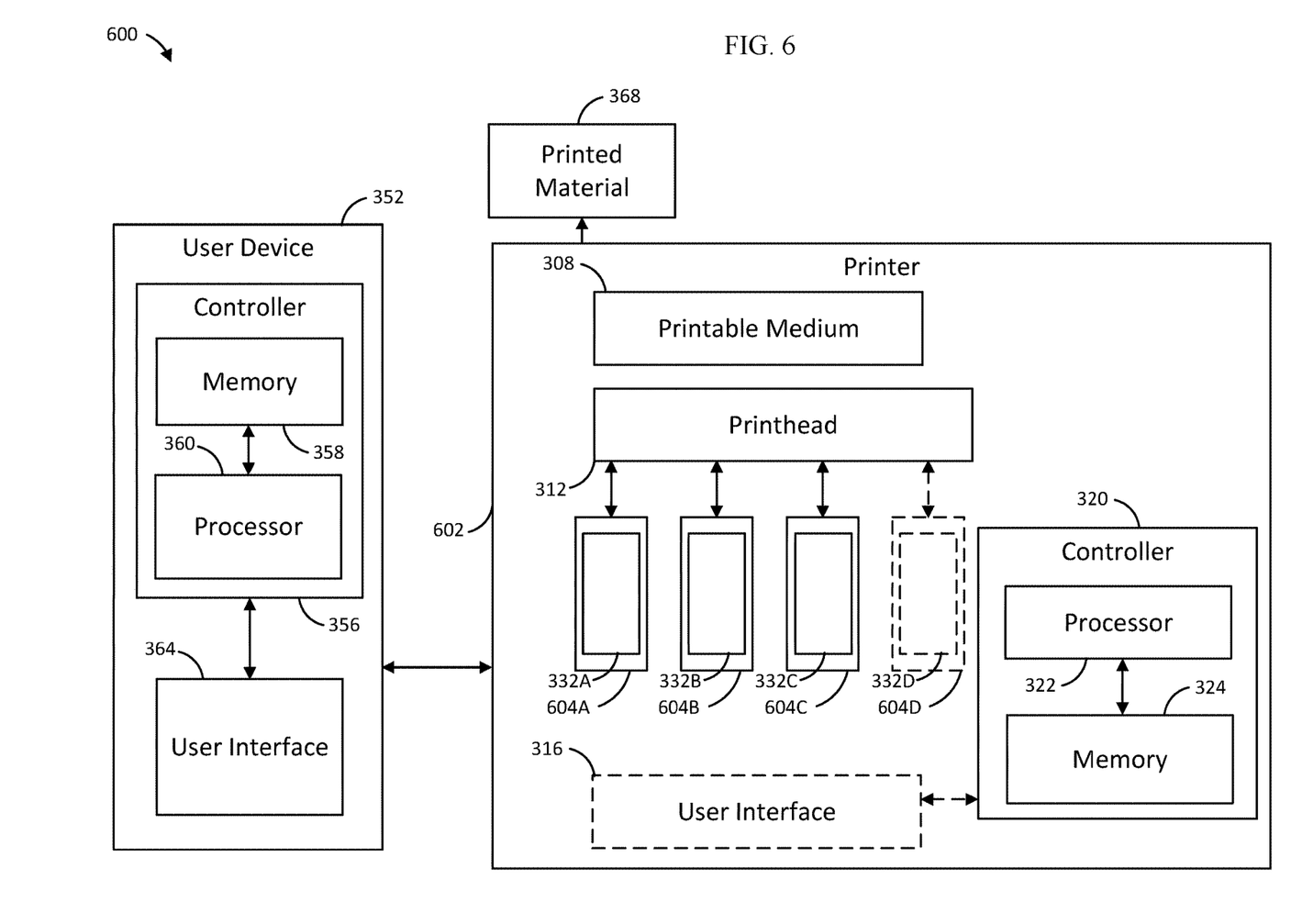
FIG. 6 shows another exemplary embodiment of a printing system.

Referring now to FIG. 3 as well as FIG. 6, another exemplary embodiment of a printing system 600 is shown which may be suitable for printing according to the processes described herein. In the embodiment, the printing system 600 includes a printer 602 that includes at least three ink tanks containing at least three fluids, which can be fluids 332A-C as described above. The at least three ink tanks can include a first ink tank 604A, a second ink tank 604B, a third ink tank 604C, and an optional fourth ink tank 604D. In some embodiments, the printer 602 can include up to six ink tanks and at least six fluids. The ink tanks 604A-D can be refilled, eliminating the need for replacing ink cartridges. The printer can include the controller 320 coupled to the optional printer user interface 316 as described above. The printer 602 can be coupled to the user interface 352 as described above. The controller 320 can be coupled to sensors (not shown) configured to sense fluid levels of the ink tanks 604A-D. The printer can include the printhead 312 and the printable medium 308 as described above, and can be configured to generate the printed material 368 described above.

Figure 7:
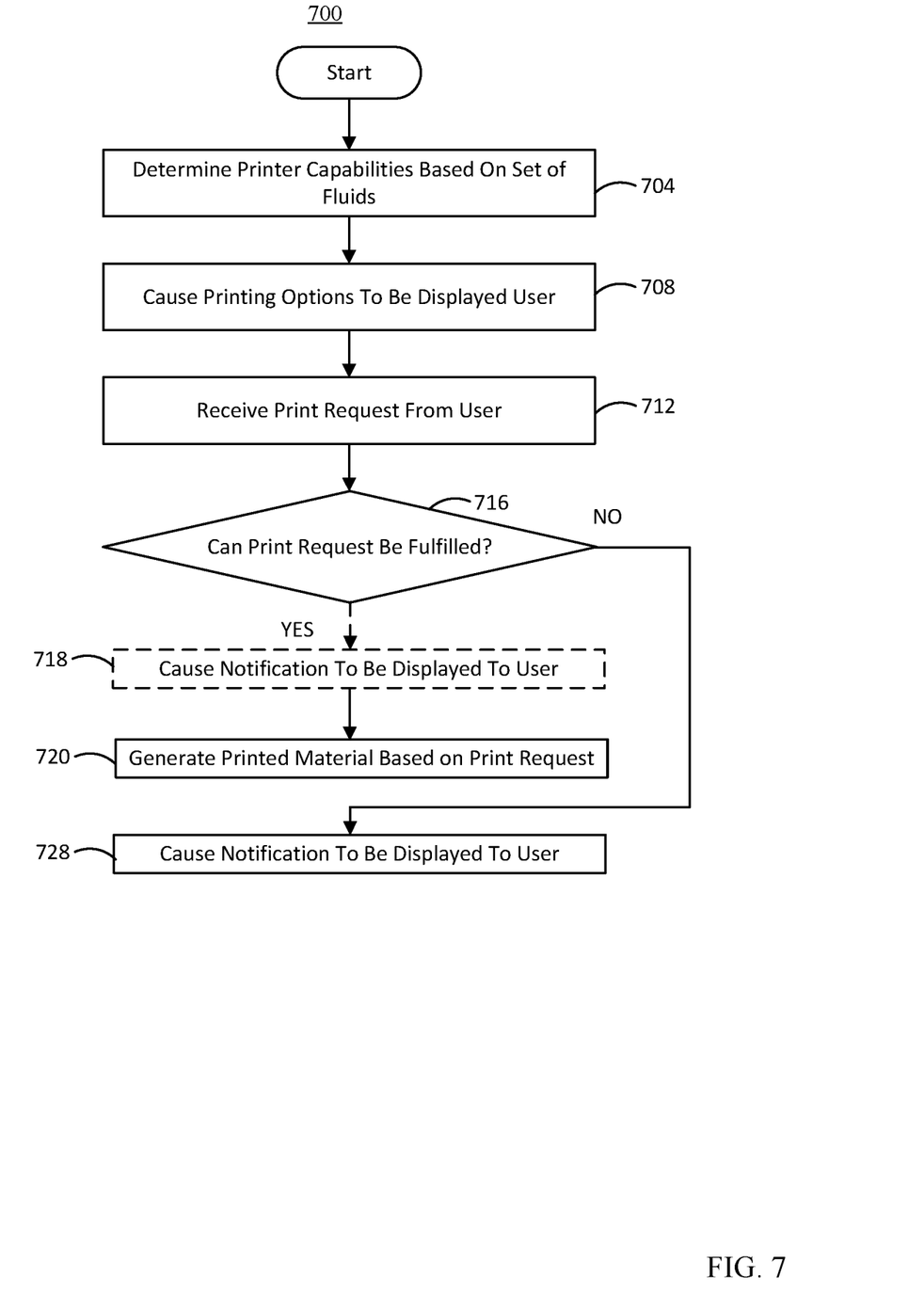
FIG. 7 shows a process for generating a printed material using a printer with alternative inkset.

Referring now to FIG. 7, a process 700 for generating a printed material, which can be the printed material 368 described above, using a printer with alternative inkset, such as the printer 304 and/or the printer 602 described above, is shown. The process 700 can be implemented as computer readable instructions on at least one memory such as the memory 324 and/or the memory 358, and executed by at least one processor such as the processor 322 and/or the processor 360 described above. At least a portion of the instructions can be stored on the memory 358 and included in a print request editing program such as Brady Workstation. The print request editing program can be executed by the user device 352 in order to create print requests based on input from a user.

At step 704, the process 700 can determine printer capabilities based on a set of fluids. The set of fluids can include the fluids 332A-C and/or any of fluids 332D-F as described above. The process 700 may receive identifying information about the set of fluids from the memory 340 included in the ink cartridge as described above. As mentioned above, the fluids 332A-F can include one or more process color inks and optionally one or more alternative fluids. The process 700 can determine a range of colors that can be produced using the one or more process color inks based on the color of each process color ink included in the set of fluids. More specifically, the process 700 can determine a range of colors that can be produced using each process color ink individually as well as a range of colors that can be produced by applying two or more process color inks in a dither pattern, if applicable. Some colors that are reproducible without dithering dots of multiple different inks may have the same a*b* value as the color of one of the process color inks, and only vary in lightness or darkness along the L* axis. A single process color ink can be used to recreate these colors by simply varying the size or spacing of the dots of process color ink applied to the printable medium 308 (e.g., applying smaller or more widely spaced dots for lighter colors, or applying larger or more closely spaced dots for darker colors). Other colors may be reproducible by applying dots of multiple process color inks in a dither pattern to effectively create colors other than the colors of the process color inks. Additionally, the process 700 can determine if the set of fluids include any alternative fluids that can add certain features to a printed material. The alternative fluids can include a gloss coating, a UV protection clear coating, other clear coatings, a scratch resistant coating, a fluorescent color ink, conductive inks, and/or or fluids that include taggants, thermochromic materials, magnetic materials, reactive materials, and/or materials which are not in the visible spectrum but may be detected by ultraviolet or infra-red radiation as described above. The process 700 can then proceed to step 708.

At step 708, the process 700 can cause printing options to be displayed the user. The printing options can be displayed at one or more user interfaces such as the user interface 364 and/or the printer user interface 316 described above. The printing options can include the range of colors that can be produced using each process color ink individually, the range of colors that can be produced by dithering dots of two or more process color inks, and any features that can be added to the printed material as determined at 704. The process 700 can then proceed to step 712.

At step 712, the process 700 can receive a print request from a user. The print request can include a graphic including text and/or at least one image to be printed on the printable medium 308 in order to form the printed material. The graphic may be printed (if the print request can be fulfilled, as will be explained below) using at least one fluid, for example any of the set of fluids, included in the ink cartridge 328 and/or the second ink cartridge 330, or the ink tanks 604A-D. The set of fluids can include any of the process color inks or alternative fluids such as functional fluids described above. The graphic can include a number of elements (e.g., pixels), each element including a color and a spatial location (e.g., an (x,y) coordinate). The print request can also include any functional elements to be included in the printed material, such as a gloss coat, a UV protection clear coat, other clear coats, a scratch resistant coat, a fluorescent color ink, a conductive ink, taggants, thermochromic materials, magnetic materials, reactive materials, and/or materials which are not in the visible spectrum but may be detected by ultraviolet or infra-red radiation as described above. The process 700 can then proceed to step 716.

At step 716, the process 700 can determine if the print request can be fulfilled based on the set of fluids. More specifically, the process 700 can determine if the print request can be fulfilled based on any alternative fluids included in the set of fluids as well as one or more process color inks included in the set of fluids.

If the print request includes one or more functional elements, the process 700 can also determine if an appropriate fluid or fluids included in the set of fluids can be used to generate the required functional element(s). For example, if the print request included a UV protection clear coat, and a UV protection clear coating is included in the set of fluids, the process 700 can determine that the functional element(s) can be generated.

In addition to determining if any functional elements included in the print request can be generated, the process 700 can determine if the print request can be fulfilled using the set of fluids. The process 700 can determine if all colors included in elements of the graphic included in the print request can be reproduced by the printer within a predetermined margin. The process 700 can determine if the colors included in the graphic can be reproduced without applying dots of different process color inks in a dither pattern based on the color(s) of the process color inks. In other words, the process 700 can determine if the graphic can be reproduced solely using the native colors of the one or more process color inks included in the set of fluids. Some colors that are reproducible without dithering dots of ink may have the same a*b* value as the color of one of the process color inks, and only vary in lightness or darkness along the L* axis. A single process color ink can be used to recreate these colors by simply varying the size or spacing of the dots of process color ink applied to the printable medium 308 (e.g., applying smaller or more widely spaced dots for lighter colors, or applying larger or more closely spaced dots for darker colors).

The process 700 can also determine if the colors included in the graphic can be reproduced by applying two or more process color inks included in the set of fluids. As described above, dots of multiple process color inks can be applied in a dither pattern in order to create colors beyond the (native) colors of the one or more process color inks included in the set of fluids. The process 700 can determine if the colors included in the print request can be produced within the predetermined margin using two or more process color inks included in the set of fluids based on the color(s) of the process color inks.

The process 700 can determine that the print request can be fulfilled if both (1) any functional elements included in the print request can be generated using the set of fluids, and (2) all colors included in the print request can be reproduced by the printer within the predetermined margin.

If the process 700 determines that the print request can be fulfilled (i.e., "YES" at step 716), the process 700 can, in some embodiments, proceed to optional step 718. In other embodiments, the process 700 can proceed to step 720. If the process 700 determines that the print request cannot be fulfilled (i.e., "NO" at step 716), the process 700 can proceed to step 728.

At step 718, the process 700 can cause a notification to be displayed to the user. The notification can be displayed to one or more user interfaces such as the user interface 364 and/or the printer user interface 316 described above. The notification can include information about an alternative ink cartridge that may better fulfill the print request than the ink cartridge currently supplying the set of fluids. For example, the print request may be able to be fulfilled without dithering multiple process color inks using the alternative ink cartridge.

Alternatively or in addition, the notification may include information about another alternative ink cartridge that may provide the same color reproduction abilities as the ink cartridge currently supplying the set of fluids but with an additional or different functional feature. For example, the ink cartridge currently supplying the set of fluids may include a clear coat, but the alternative ink cartridge may include taggants.

In embodiments where the printer can receive the second ink cartridge 330, the notification can include information about yet another alternative ink cartridge that only includes functional fluids. With the addition of this ink cartridge, the printer may retain the same color reproduction capabilities while adding multiple additional functional features. In embodiments where the printer 304 can receive the second ink cartridge 330, the notification can include information about a further alternative ink cartridge that includes at least one process color ink not included in the set of fluids. The further alternative ink cartridge may include a black process color ink and no other fluids.

In embodiments where the printer includes ink tanks (e.g., the printer 602), the notification can include information about one or more fluids that can be used to add additional color printing capabilities and/or functional feature generating capabilities to the printer.

The notification may inform the user about relevant products the user may not have been aware of previously. The notification may also include information about relevant printable mediums such as labels that could alternatively be used to fulfill the print request. The process 700 can then proceed to step 720.

At step 720, the process 700 can generate the printed material 368 based on the print request. The process 700 can cause the printer (e.g., the printer 304 or the printer 602) to jet fluids included in the set of fluids onto the printable medium 708 and produce the printed material 368. The process 700 can then end.

If the print request cannot be fulfilled, at step 728 the process 700 can cause a notification to be displayed to the user. The notification can be displayed to one or more user interfaces such as the user interface 364 and/or the printer user interface 316 described above. The notification can contain information that the printer cannot fulfill the print request. The notification can also include information about one or more ink cartridges and/or fluids that may be used to fulfill the print request. The notification can include information about a substitute process ink that can fulfill the print request. The substitute process ink can be an ink that will most closely fulfill the print request (e.g., the substitute process ink is of the color closest to those included in the print request that could not be fulfilled with the currently available inks). For example, the notification may include statements such as "The installed ink cartridge does not contain all the colors required for this print request. Please install a 'cartridge A' and click on the refresh icon to print all the colors in the print request." The "cartridge A" may be a J20-CMY full color ink cartridge or other appropriate cartridge that would be best-suited for performing the print request based on the inks the cartridge contains, especially in the case where a specialized or non-standard inkset is utilized. In some embodiments, the process 700 may provide an option to print the print request with the current inks to a user in the notification. In these embodiments, if the user selects the option to print the print request, the process 700 can cause a supplementary notification including a warning to the user. For example, the supplementary notification may include "The print request includes colors that are not supported in this color mode. Unsupported colors will be replaced at print time." The supplementary notification can include an option to continue (e.g., "ok"), and if the user selects the option to continue, the process 700 can proceed to 720. The process 700 can then end.

It should be noted that, as used herein, the term mechanism can encompass hardware, software, firmware, or any suitable combination thereof.

It should be understood that the above-described steps of the processes of FIG. 7 can be executed or performed in other order or sequence not limited to the order and sequence shown and described in the figures. Also, some of the above steps of the processes of FIG. 7 can be executed or performed substantially simultaneously where appropriate or in parallel to reduce latency and processing times.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. An ink cartridge configured to provide ink to a printable medium, the ink cartridge comprising:
   a first ink tank comprising a first ink comprising a process ink;
   a second ink tank comprising a second ink;
   a third ink tank comprising a third ink comprising a functional ink; and
   one printhead, wherein each of the first ink tank, the second ink tank, and the third ink tank is coupled to the printhead.

2. The ink cartridge of claim 1, wherein the functional ink comprises a conductive ink.

3. The ink cartridge of claim 1, wherein the first ink, the second ink, and the third ink are configured to be applied to a printable medium, and wherein the functional ink comprises a clear ink configured to provide UV protection, abrasion/scratch resistance, gloss, or other beneficial attributes to the printable medium.

4. The ink cartridge of claim 1, wherein the functional ink comprises a thermochromic ink configured to be applied to a printable medium, the functional ink being configured to change appearance in response to a change in temperature.

5. The ink cartridge of claim 1, wherein the functional ink comprises traceable particles configured to emit an electromagnetic signal in response to stimulation.

6. The ink cartridge of claim 1, wherein the second ink comprises a second functional ink.

7. The ink cartridge of claim 1, wherein the first ink tank, the second ink tank, and the third ink tank are integral with the printhead.

8. The ink cartridge of claim 1, wherein the printhead is a multi-color printhead.

9. The ink cartridge of claim 1, wherein the functional ink is configured to provide UV protection.

10. The ink cartridge of claim 1, wherein the ink cartridge comprises a memory having information about the first ink, the second ink, and the third ink stored thereon.

* * * * *